United States Patent
Bolig et al.

(10) Patent No.: US 7,000,310 B2
(45) Date of Patent: Feb. 21, 2006

(54) METHOD OF HANDLING A WORKPIECE

(75) Inventors: Christa Marie Bolig, San Jose, CA (US); Richard D. Bunch, San Jose, CA (US); Yun-Lin Hsiao, San Jose, CA (US); Timothy Joseph Neumann, San Jose, CA (US); Li Zheng, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 147 days.

(21) Appl. No.: 10/734,951

(22) Filed: Dec. 12, 2003

(65) Prior Publication Data
US 2005/0125995 A1    Jun. 16, 2005

(51) Int. Cl.
*G11B 5/127* (2006.01)

(52) U.S. Cl. ............... 29/603.17; 29/603.07; 156/249

(58) Field of Classification Search ............ 29/603.02, 29/603.03, 603.06, 603.07, 603.12, 603.17, 29/603.19, 412–417; 156/230, 248, 249, 156/265
See application file for complete search history.

(56) References Cited

U.S. PATENT DOCUMENTS

| | | | | |
|---|---|---|---|---|
| 6,088,909 A | * | 7/2000 | Ouchi et al. | 29/603.16 |
| 6,551,438 B1 | * | 4/2003 | Tanemura | 156/265 |
| 6,865,798 B1 | * | 3/2005 | Fukuroi | 29/603.07 |
| 2002/0170164 A1 | * | 11/2002 | Fukuroi | 29/603.07 |
| 2003/0172521 A1 | * | 9/2003 | Watanuki | 29/603.12 |

* cited by examiner

Primary Examiner—David P. Bryant
Assistant Examiner—Sarang Afzali
(74) Attorney, Agent, or Firm—Bracewell & Giuliani LLP

(57) ABSTRACT

A method for handling workpieces such as hard disk drive sliders during a debonding process uses a fixture having two sets of finger-like projections that are interleaved. The sets are movable relative to each other to space apart the sliders after they are processed from their original row configuration. The post-processing separation is required to properly debond the sliders. The fingers on each set are closely interleaved to reduce the amount of displacement required to adequately separate the sliders for debonding. After the sliders are displaced, they are directly debonded into the inspection trays. This design eliminates the need for manual handling of the workpieces during these phases of manufacturing.

17 Claims, 5 Drawing Sheets

METHOD OF HANDLING A WORKPIECE

BACKGROUND OF THE INVENTION

1. Technical Field

The present invention relates in general to an improved miniature workpiece-handling device and, in particular, to an improved system, method, and apparatus for handling hard disk drive sliders during the debonding process.

2. Description of the Related Art

Referring to FIG. 1, a conventional slotted extender 11 for debonding single sliders during a slider fabrication process is shown. Prior to debonding, an elongated workpiece or row 13 is mounted to and supported by all of the pads 15 of the extender 11. The row 13 is typically bonded to the pads 15 with an adhesive substance. The row 13 has a width that is narrower than a width 17 of the pads 15, and is approximately equal in length to the combined length 19 of all of the pads 15. The pads 15 are spaced apart from each other by a narrow slit 21 that is usually less than 200 microns wide.

After the row 13 is mounted on the pads 15, the row 13 is processed as is known in the art, which includes cutting the row 13 into discrete sliders 23 (FIG. 2). The number of sliders 23 is typically equal to the number of pads 15. When processing of the sliders 23 is complete, the sliders 23 must be debonded from the pads 15. However, because the sliders 23 are so close to one another (i.e., spaced apart by approximately the widths of slits 21), they must be manually removed from the extender 11, typically with tweezers. The operator removes the sliders 23 from extender 11 and places them in an inspection tray 25. Unfortunately, the spacings 27 between the receptacles 29 in the inspection tray 25 are required to be significantly larger than the widths of slits 21 in better facilitate the debonding process.

The necessity of this manual transfer of the sliders 23 to the inspection trays 25 can cause handling damages to the sliders 23 and the addition of various forms of contamination. In addition, when the bond surfaces of the pads 15 are worn, defects are caused in subsequent cutting processes. Moreover, these issues give rise to incomplete coverage of the pole tips of the sliders 23 and an increased concern for corrosion. Thus, an improved system for handling hard disk drive sliders during the debonding process would be desirable.

SUMMARY OF THE INVENTION

One embodiment of a system, method, and apparatus for handling workpieces such as hard disk drive sliders during a debonding process is described. The present invention utilizes a fixture having two sets of finger-like projections that are interleaved. The sets are movable relative to each other to space apart the sliders after they are processed from their original row configuration. The post-processing separation is required to properly debond the sliders. In one embodiment, the fixture has two sets of 22 fingers for a total of 44 fingers. The fingers on each set are closely interleaved to reduce the amount of displacement required to adequately separate the sliders for debonding. After the sliders are displaced, they are directly debonded into the inspection trays. This design eliminates the need for manual handling of the workpieces during these phases of manufacturing.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
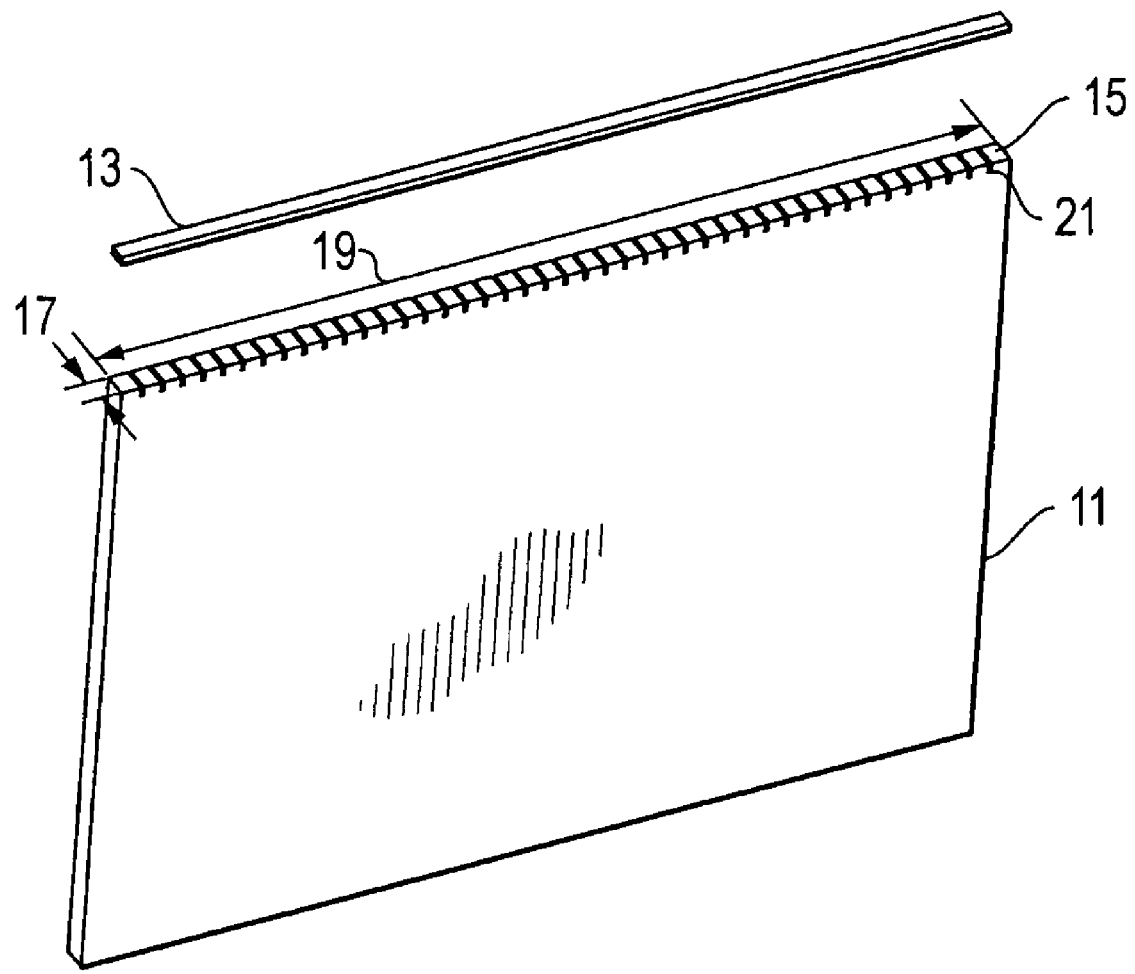
FIG. 1 is an isometric view of a conventional slotted extender for handling sliders.
Figure 2:
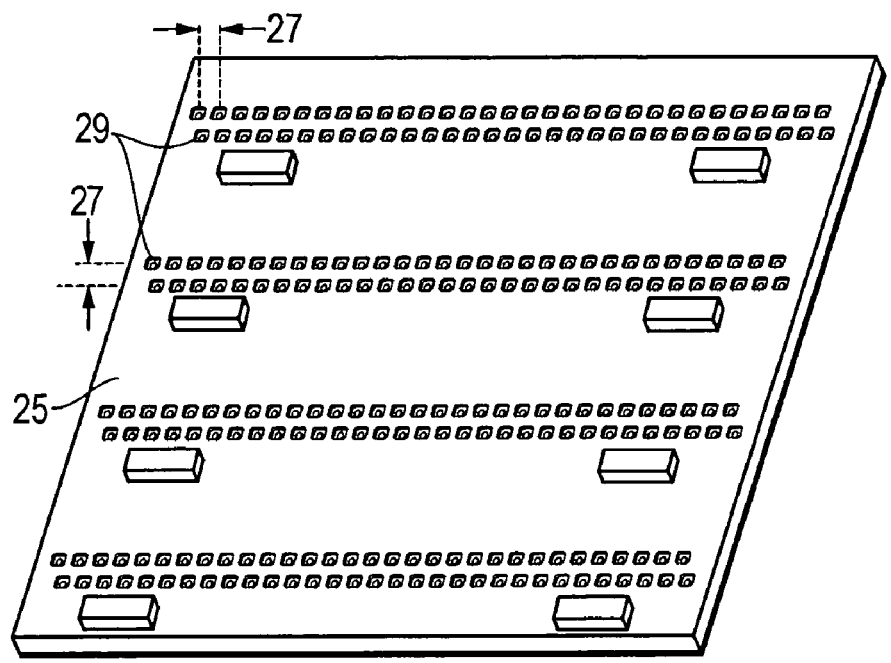
FIG. 2 is an isometric view of the extender of FIG. 1 and an inspection tray.
Figure 2:
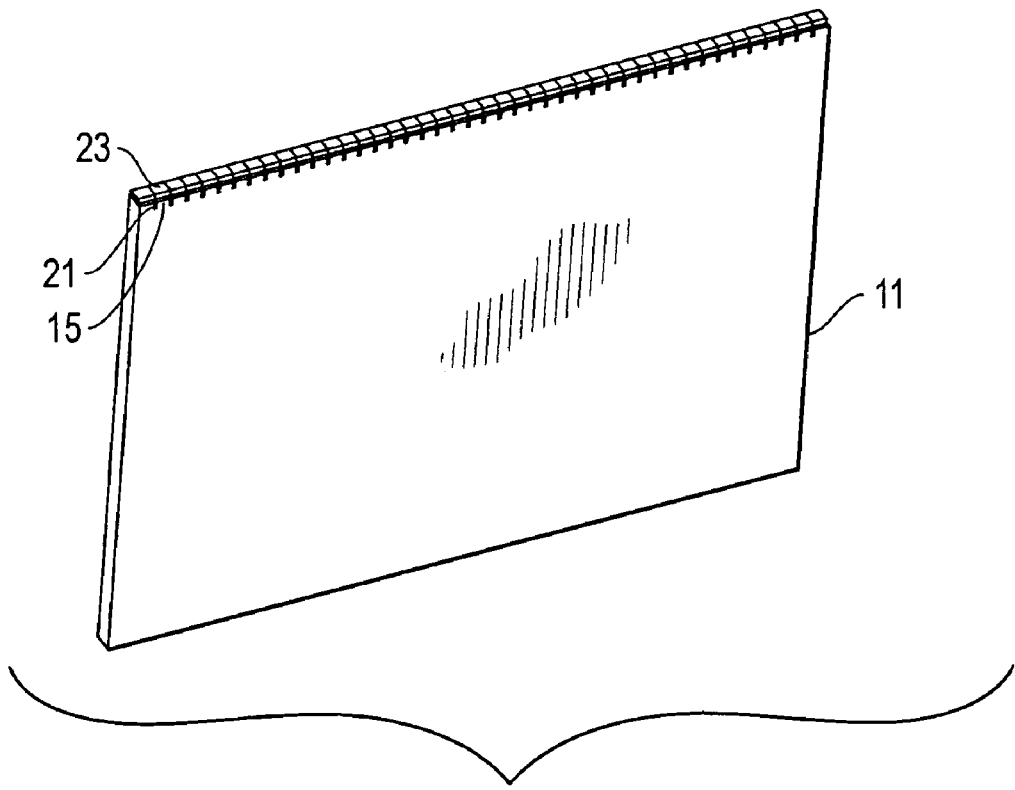
Figure 3:
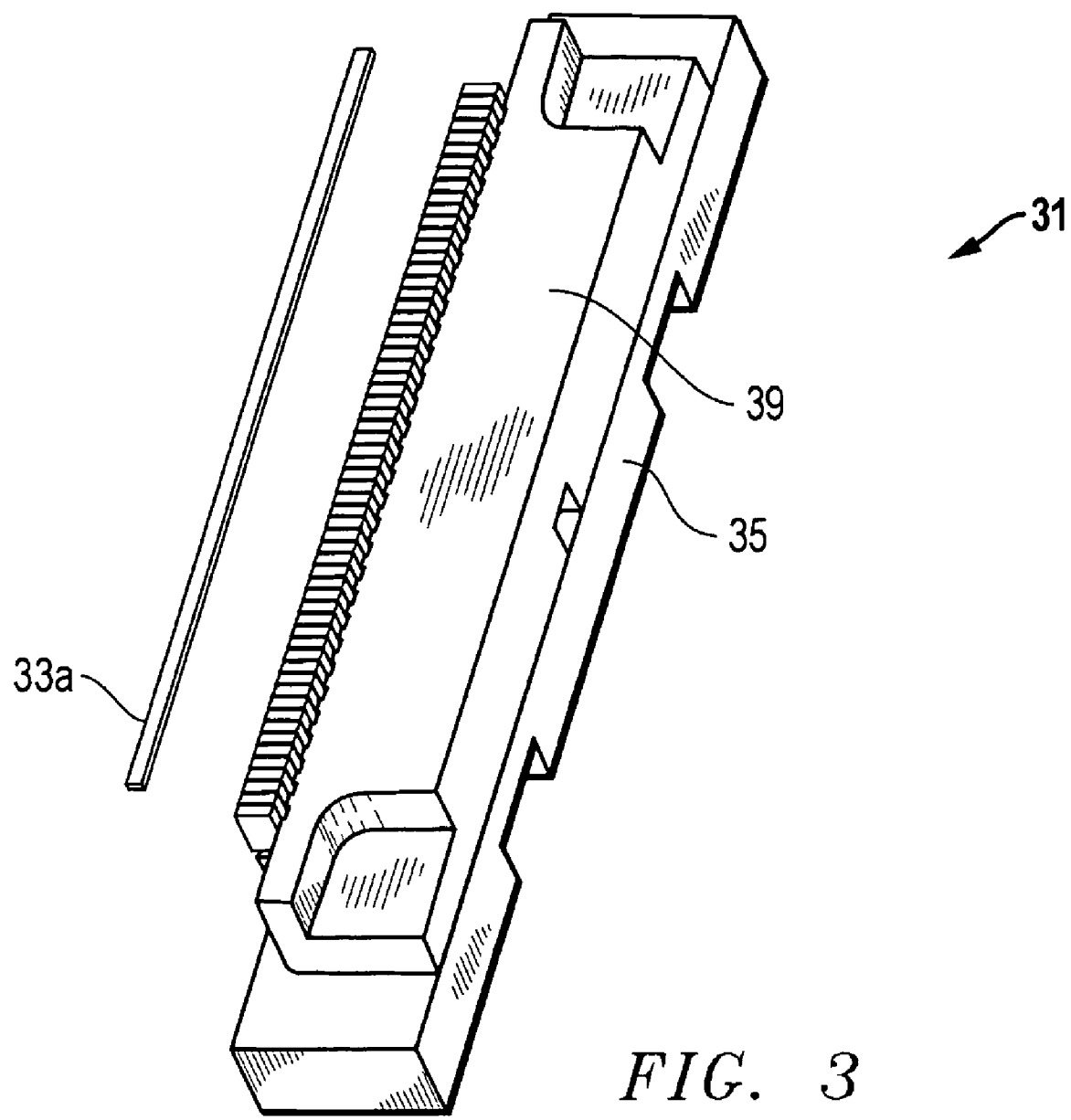
FIG. 3 is an isometric view of slider fixture shown in a retracted position and is constructed in accordance with the present invention.
Figure 4:
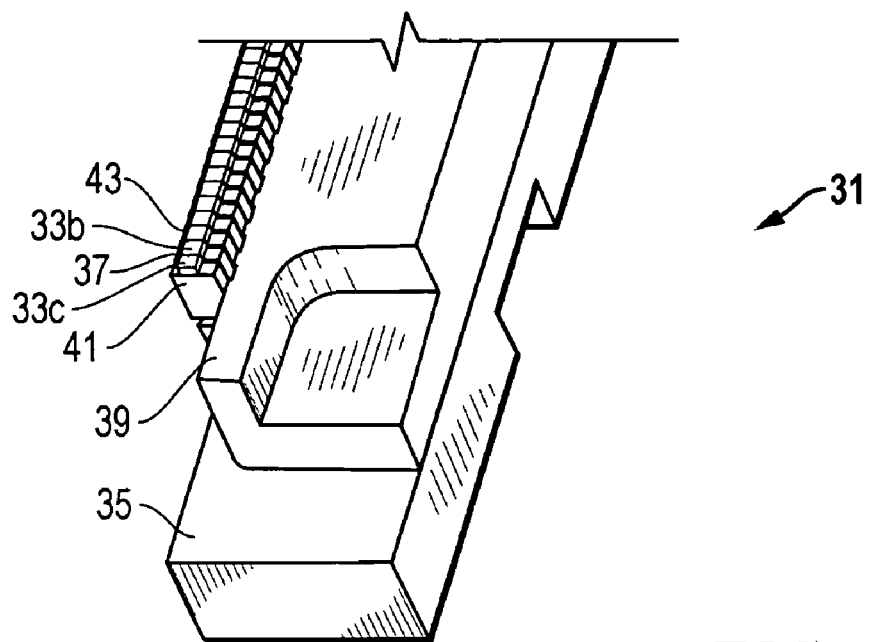
FIG. 4 is an enlarged isometric view of one end of the slider fixture of FIG. 3 and is shown in the retracted position and loaded with sliders.

Referring to FIGS. 3–6, one embodiment of an apparatus or fixture 31 for handling a workpiece(s) 33 is shown. In the preferred embodiment, the fixture 31 is designed to process a single slider row 33a (FIG. 3) into a plurality of individual slider pieces 33b, 33c (FIG. 4). The fixture 31 comprises a base 35 having a first set of platforms 37 for supporting the workpiece 33a or workpieces 33b. The fixture 31 also comprises a body 39 that is slidably mounted to and movable (such as by pneumatic actuation) relative to the base 35. The body 39 has a second set of platforms 41 for supporting the workpiece 33a or other ones of the workpieces 33c.

The fixture 31 moves between an open position (FIG. 5) and a closed position (FIGS. 3 and 4). In the closed position, the second set of platforms 41 and all of the workpieces 33c are slightly spaced apart, interleaved, and aligned with the first set of platforms 37. In the open position (FIG. 5), the second set of platforms 41 and said other ones of the workpieces 33c are further spaced apart from (than when in the closed position) and misaligned with the first set of platforms 37 and the workpieces 33b.

In the embodiment shown, each of the platforms 37, 41 is a finger-like projection having a surface for supporting the workpiece 33a or one of the workpieces 33b, 33c. The platforms 37, 41 are interleaved, which, in the embodiment shown, means that individual ones of the first set of platforms 37 are located immediately adjacent to at least one of the platforms 41 in the second set of platforms 41. In the closed position (FIGS. 3 and 4), the platforms 37, 41 are spaced apart by a dimension of approximately 50 to 200 microns. In the open position (FIG. 5), the two sets of platforms 37, 41 are spaced apart from each other by a larger dimension that is at least approximately 1700 microns, and the platform-to-platform spacing (e.g., between adjacent platforms 37, or between adjacent platforms 41) is at least approximately 700 microns. Moreover, in the closed position, the first set of platforms 37 are spaced apart from the second set of platforms 41 by narrow slits 43 (FIG. 4). In one embodiment, all of the platforms 37, 41 are co-planar in at least the closed position and, preferably, all of the platforms 37, 41 are co-planar in both the open and closed positions.

The fixture 31 of the present invention is part of a system for processing the workpiece 33a. Initially, the single workpiece 33a is mounted to the fixture 31 while the fixture 31 is in the closed position. The workpiece 33a is processed while supported by at least some of the platforms 37, 41 in both sets of platforms 37, 41. The processing includes cutting the workpiece 33a (such as an elongated slider row) into pieces 33b, 33c (such as individual sliders) that remain mounted to respective ones of the platforms 37, 41. The fixture 31 is then moved to the open position such that the platforms 37, 41 and the pieces 33b, 33c, respectively, are spaced further apart from each other than when they were in the closed position.

As described above, the platforms 37, 41 are interleaved with each other in the closed position, such that individual ones of the first set of platforms 37 are located immediately adjacent to at least one of the platforms 41 in the second set of platforms 41. In the system of the present invention, the workpiece 33a may be bonded to at least some of the platforms 37, 41 of both sets of the platforms 37, 41 while the fixture 31 is in the closed position, and the pieces 33b, 33c are debonded from said at least some of the platforms 37, 41 of both sets of the platforms 37, 41 while the fixture 31 is in the open position.

Figure 6:
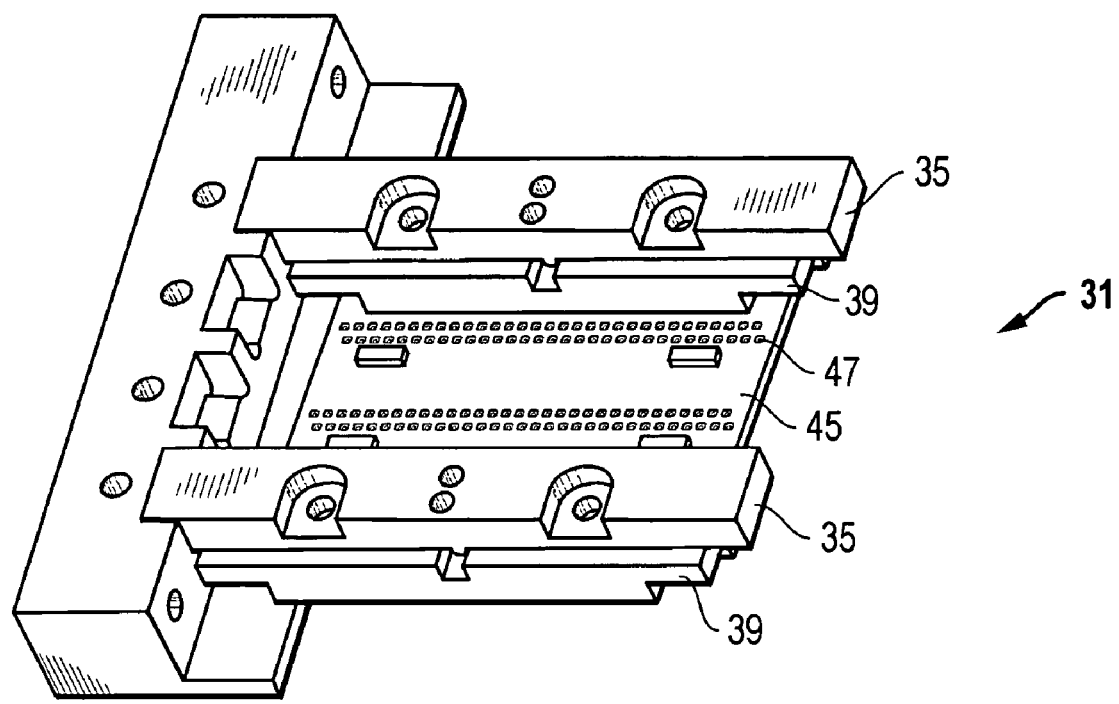
FIG. 6 is an isometric view of two of the slider fixtures of FIG. 5 shown inverted and adjacent to a slider debond inspection tray.

As shown in FIG. 6, a tray 45, such as a debonding inspection tray, has receptacles 47 for receiving individual respective ones of the pieces 33b, 33c. The pieces 33b, 33c are automatically removed from the fixture 31 and placed into the receptacles 47 without manual handling of individual ones of the pieces 33b, 33c. In one embodiment, the fixture 31 is inverted with the pieces 33b, 33c attached to position the pieces 33b, 33c in the receptacles 47. The pieces 33b, 33c are retained in the receptacles 47 with the fixture 31 while the pieces 33b, 33c are being debonded and removed from the fixture 31.

The present invention also comprises a method of handling a workpiece(s) 33. The method comprises providing a workpiece 33a (see slider row 33a in FIG. 3) having a first configuration (e.g., an aligned, elongated row, such as FIGS. 3 and 4), and mounting the workpiece 33a on a fixture 31, such as by bonding. The workpiece 33a is processed while the workpiece 33a is mounted to the fixture 31, which includes cutting the workpiece 33a into pieces 33b, 33c that remain mounted to the fixture 31 and in the first configuration. The method further comprises articulating the fixture 31 such that the pieces 33b, 33c are oriented in a second configuration (e.g., spread or spaced-apart rows, such as FIG. 5).

Figure 5:
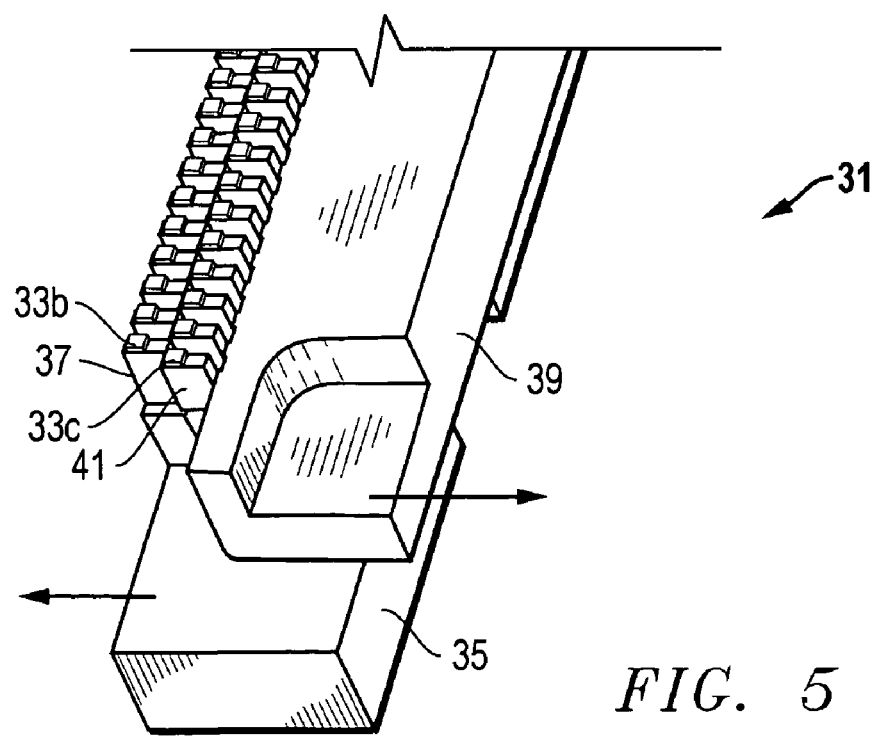
FIG. 5 is an enlarged isometric view of the end of the slider fixture of FIG. 4 and is shown in the extended position and loaded with sliders.

As shown in FIG. 6, the method comprises positioning the pieces 33b, 33c in the receptacles 47 (e.g., via debonding) that are arranged in the second configuration, and dismounting the pieces 33b, 33c from the fixture 31 such that the pieces 33b, 33c remain in the receptacles 47. The method may comprise mounting the workpiece 33a to a plurality of the aligned platforms 37, 41 (FIGS. 3 and 4), and later misaligning the platforms 37, 41 such that the pieces are further spaced apart from each other (FIG. 5).

The receptacles 47 may be part of the inspection tray 45 in which the pieces 33b, 33c are placed. As described above, the method may comprise inverting the fixture 31 with the pieces 33b, 33c attached in order to position the pieces 33b, 33c in the receptacles 47, and retaining the pieces 33b, 33c in the receptacles 47 with the fixture 31 while the pieces 33b, 33c are being dismounted from the fixture 31. Preferably, these steps comprise automatically transferring the pieces 33b, 33c to the receptacles 47 without manual handling. Furthermore, the pieces 33b, 33c may be co-planar in both the first and second configurations.

The present invention has several advantages, including the ability to handle sliders during a debonding process without the need for manual intervention. The interleaved fingers are movable relative to each other to space apart the sliders after they are processed from their original row configuration. The fingers on each set are closely interleaved to reduce the amount of displacement required to adequately separate the sliders for debonding. After the sliders are displaced, they are directly debonded into the inspection trays. This design eliminates the need for manual handling of the workpieces during these phases of manufacturing.

While the invention has been shown or described in only some of its forms, it should be apparent to those skilled in the art that it is not so limited, but is susceptible to various changes without departing from the scope of the invention.

What is claimed is:

1. A method of handling a workpiece, comprising:
   (a) providing a workpiece having a first configuration;
   (b) mounting the workpiece on a fixture;
   (c) processing the workpiece while the workpiece is mounted to the fixture;
   (d) cutting the workpiece into pieces that remain mounted to the fixture and in the first configuration;
   (e) articulating the fixture such that the pieces are oriented in a second configuration;
   (f) positioning the pieces in receptacles that are arranged in the second configuration and inverting the fixture with the pieces attached in order to position the pieces in the receptacles; and then
   (g) dismounting the pieces from the fixture such that the pieces remain in the receptacles and retaining the pieces in the receptacles with the fixture while the pieces are being dismounted from the fixture.

2. The method of claim 1, wherein step (a) comprises configuring the workpiece in an elongated row, and step (e) comprises rearranging the elongated row by spreading the pieces apart.

3. The method of claim 1, wherein step (b) comprises bonding the workpiece to the fixture.

4. The method of claim 1, wherein step (a) comprises providing the workpiece as a slider row, and step (d) comprises cutting the slider row into individual sliders.

5. The method of claim 1, wherein step (b) comprises mounting the workpiece to a plurality of aligned platforms, and step (e) comprises misaligning the platforms such that the pieces are further spaced apart from each other.

6. The method of claim 1, wherein step (f) comprises placing the pieces in an inspection tray.

7. The method of claim 1, wherein step (g) comprises debonding the pieces from the fixture.

8. The method of claim 1, wherein steps (e)–(g) comprise automatically transferring the pieces to the receptacles without manual handling.

9. The method of claim 1, wherein the pieces are co-planar in both the first and second configurations.

10. A method of handling a workpiece, comprising:
    (a) providing a workpiece having a first configuration;
    (b) mounting the workpiece to a fixture comprising a plurality of aligned platforms;
    (c) processing the workpiece while the workpiece is mounted to the fixture;

(d) cutting the workpiece into pieces that remain mounted to the fixture and in the first configuration;
(e) articulating the fixture to orient the pieces in a second configuration by misaligning the platforms such that the pieces are further spaced apart from each other;
(f) positioning the pieces in receptacles that are arranged in the second configuration; and then
(g) dismounting the pieces from the fixture such that the pieces remain in the receptacles.

11. The method of claim 10, wherein step (a) comprises configuring the workpiece in an elongated row, and step (e) comprises rearranging the elongated row by spreading the pieces apart.

12. The method of claim 10, wherein step (b) comprises bonding the workpiece to the fixture.

13. The method of claim 10, wherein step (a) comprises providing the workpiece as a slider row, and step (d) comprises cutting the slider row into individual sliders.

14. The method of claim 10, wherein step (f) comprises placing the pieces in an inspection tray.

15. The method of claim 10, wherein step (g) comprises debonding the pieces from the fixture.

16. The method of claim 10, wherein steps (e)–(g) comprise automatically transferring the pieces to the receptacles without manual handling.

17. The method of claim 10, wherein the pieces are co-planar in both the first and second configurations.

* * * * *